United States Patent Office 3,496,191
Patented Feb. 17, 1970

3,496,191
N-CYCLOPROPYLMALEIMIDE
Roger P. Cahoy, Merriam, and Lee V. Phillips, Overland Park, Kans., assignors to Gulf Research & Development Company, Pittsburgh, Pa., a corporation of Delaware
No Drawing. Filed June 30, 1967, Ser. No. 650,246
Int. Cl. C07d 27/00
U.S. Cl. 260—326.5                                    1 Claim

ABSTRACT OF THE DISCLOSURE

Crop seeds and seedlings, particularly cotton and barley are protected from soil-borne fungus diseases by applying to the locus of the seeds either prior to or during planting, an effective amount of N-cyclopropylmaleimide, a new organic compound prepared from cyclopropylamine and maleic anhydride.

SUMMARY OF INVENTION

It has been known for about thirty years that N-alkylmaleimides are extremely toxic to a great variety of living organisms. There have been various proposals of ways of making advantageous use of these toxic properties. The most obvious use is probably the sterilization of organic materials. Unfortunately, sterile materials which contain a residue of highly toxic substance have very little utility.

In an effort to overcome the residual toxicity problem, it has been determined that increasing chain length of the N-alkyl substituent also increases toxicity. By employing smaller quantities of more toxic materials it has been anticipated that residual N-alkylmaleimide would decompose and disappear within a reasonable length of time and some selectivity of action could be enjoyed. The expectations have not been realized, partially because the more toxic N-substituted maleimides have been found to be decreasingly selective, tending to kill indiscriminately both the pathologic organisms and the plant or animal which it was intended to protect.

We have synthesized N-cyclopropylmaleimide, which, while a little less active than previously known N-alkylmaleimides, can be used in reasonable amounts with very useful selectivity, particularly to protect seeds and immature plants from soilborne fungus diseases. The manner in which this is accomplished without substantial injury to the plants is not definitely established. However, an acceptable theory is that N-cyclopropylmaleimide decomposes in the presence of moisture and bacteria in fertile soil with sufficient speed so that by the time the seedling plant is taking in substantial quantities of nutrients through its roots, toxic quantities of the substance are no longer present. This theory is supported by the observation of rapid disappearance of N-cyclopropylmaleimide from soil and absence of detectable residues of the substance in growing plants from treated seeds.

The active chemical is preferably employed in seed-treating formulations prior to planting, or is applied to the seed and the immediately surrounding soil when the seed is planted.

DETAILED DESCRIPTION (A) Preparation of the active compound

N-cyclopropylmaleimide may be prepared from cyclopropylamine and maleic anhydride, both of which are articles of commerce. The following procedure or a modification thereof may be employed.

(1) Preparation of N-cyclopropylmaleamic acid

Materials.—10 g. (0.175 mole) cyclopropylamine, 17.6 g. (0.18 mole) maleic anhydride Procedure.—A 100 ml. round bottomed flask fitted with thermometer, power stirrer, dropping funnel and drying tube was charged with 17.6 g. (0.18 mole) maleic anhydride and 40 ml. glacial acetic acid. The dropping funnel contained 10 g. (0.175 mole) of cyclopropylamine. After the anhydride had dissolved a few drops of amine were added and cooling was applied to reaction flask to maintain a temperature of 25–30°. The amine was added dropwise over a 40 minute period to well-stirred reaction mixture. After adding about 5 ml. of amine, white solid began to precipitate. When addition was completed, the reaction mixture was stirred at ambient temperature for 30 minutes. The white solid was collected on a vacuum filter, slurried in ether and dried in a vacuum oven. The 24.5 g. sample melted at 155–60° C. with evolution of water. The second crop of crystals from the acetic acid-diethylether filtrate weighed 1.0 g. (M.P. 140–4°). A portion of the initial crop was twice recrystallized from absolute ethanol, M.P. 158–161°. An infrared spectrum indicated NH absorption and 5.8 and 6.1 micron carbonyl bands as well.

Analysis.—Calc'd for $C_7H_9NO_3$: C, 54.17; H, 5.85; N, 9.04. Found: C, 54.26; H, 5.85; N, 9.11.

(2) Preparation of N-cyclopropylmaleimide

Materials.—20 g. (0.129 mole) N-cyclopropylmaleamic acid.

Procedure.—To a 100–ml. round bottomed flask which was heated in an oil bath at a temperature of 167–70° was charged 20 g. (0.129 mole) of N-cyclopropylmaleamic acid in 5 g. portions. Within a 5 min. time interval after addition had been completed, the N-cyclopropylmaleamic acid melted and evolved water. The liquid was cooled quickly and the residue was leached with hot hexane. This hexane extract was chilled and 1.2 g. of N-cyclopropylmaleimide, M.P. 54–6°, was recovered by filtration. A sample of N-cyclopropylmaleimide prepared in a previous run in which polyphosphoric acid was employed as a diluent was recrystallized from petroleum ether to give material melting at 56–7°. The infrared spectrum was consistent with that expected for an N-substituted maleimide.

Analysis.—Calc'd for $C_7H_7NO_2$: C, 61.32; H, 5.14; N, 10.21. Found: C, 61.21; H, 5.14; N, 10.05.

(B) Agricultural use

The relative effectiveness of N-cyclopropylmaleimide may be judged by testing according to the following procedure:

Method.—Test chemicals are weighed into one-ounce bottles containing malt broth (sterilized) to give a concentration of 100 p.p.m. A spore suspension of *Aspergillus niger* or *Penicillium sp.* is added to the medium and incubated. Results are rated according to the following schedule:

0=maximum fungus growth
1=moderate fungus growth
2=slight fungus growth
3=some spores germinated
4=no observable germination or growth of fungus The following results are obtained with N-cyclopropylmaleimide by the spore germination test using two fungi:

| Concentration, p.p.m. | Aspergillus | Penicillium |
|---|---|---|
| 200 | 4 | 4 |
| 100 | 3 | 4 |
| 50 | 3 | 3 |

The protection of crop seeds and seedlings is illustrated by means of the following examples, in which controlled tests give quantitative estimates of effectiveness.

EXAMPLE 1

Soil infested with seed rotting and root-rotting organisms was mixed with test chemicals in a Patterson-Kelly blender. The soil-chemical mixture was poured into wax cartons, peas were planted, water was added, and the treatment incubated at 65° F. Results are recorded below, based on the following ratings:

Plant protection vs. phytotoxicity

0/0=seed rotted
1/1=1 to 3 healthy plants/radicle protruding from seed
2/2=4 to 6 healthy plants/root growth slight
3/3=7 to 9 healthy plants/root growth medium
4/4=10 healthy plants/root growth maximum

| Application rate: | Rating |
|---|---|
| 100 lb./a. | 4/4 |
| 50 lb./a. | 3/4 |
| 25 lb./a. | 3/4 |
| 12.5 lb./a. | 3/4 |
| 6.2 lb./a. | 3/4 |

EXAMPLE 2

Barley seed naturally infested (and supplemented with artificial infestation) with *Helminthosporium sativum* were treated with the active chemical at 6 oz./bushel. Thirty barley seed (approximately) test chemical, and one ml. of acetone were placed in a clean 1 oz. bottle. The mixture was shaken thoroughly to coat the seed followed by evaporation of the acetone. The treated seeds were planted in three 2½ inch pots, labeled and incubated approximately 3 weeks. Data on seedlings emerged, healthy plants and percentage disease control are given below:

Active chemical (6 oz./bu.): N-cyclopropylmaleimide

| | |
|---|---|
| Plants emerged | 6 |
| Healthy | 6 |
| Percent disease control | 100 |

The maximum benefit in this instance appears to be obtained in arresting the disease. Untreated seeds usually emerge, then there is a resurgence of the disease and over 90 percent of the plants die. By use of the chemical and increasing the amount of seed planted, a reasonable crop can be obtained, even from diseased seed, which is otherwise practically useless.

EXAMPLE 3

The use of N-cyclopropylmaleimide to combat Rhizoctonia seedling blight of cotton in comparison with commercial chemicals now available for this purpose is illustrated below.

Inoculum of the pathogen was prepared by culturing Rhizoctonia on vermiculite moistened with a potato-dextrose nutrient source. The inoculum was added to pasturized soil, mixed in a Patterson-Kelly blender and test chemical added. 10 cotton seeds were added to 8 oz. cartons with 3 replicates set up per test chemical. The treatments were labeled, watered, and incubated approximately 12 days. Results are presented below for tests at 50 lb./acre and at 25 lb./acre.

| Compound | Rate (lb./acre) | No. plants emerged | No. plants healthy | Disease control, percent |
|---|---|---|---|---|
| N-cyclopropylmaleimide | 50 | 25 | 25 | 100 |
| Captan | 50 | 26 | 24 | 92 |
| Captan and Terrachlor | 50 | 25 | 24 | 96 |
| Check (none) | 0 | 28 | 3 | 11 |
| N-cyclopropylmaleimide | 25 | 24 | 22 | 92 |
| Captan and Terrachlor | 25 | 28 | 23 | 82 |
| Check (none) | 0 | 25 | 3 | 12 |

The presently preferred agricultural use of N-cyclopropylmaleimide is in protection of cotton from Rhizoctonia blight and particularly irrigated cotton which is planted by precision machines and raised without cultivation.

What is claimed is:
1. N-cyclopropylmaleimide.

References Cited

Chemical Abstract—Nemeckova et al., vol. 53, p. 17340.

ALEX MAZEL, Primary Examiner

BERNARD DENTZ, Assistant Examiner

U.S. Cl. X.R.

424—274